United States Patent
Torrey et al.

(10) Patent No.: US 7,071,659 B1
(45) Date of Patent: Jul. 4, 2006

(54) CLOSED LOOP CONTROL OF EXCITATION PARAMETERS FOR HIGH SPEED SWITCHED-RELUCTANCE GENERATORS

(75) Inventors: David A. Torrey, Ballston Spa, NY (US); Yilmaz Sozer, Troy, NY (US)

(73) Assignee: Dana Corporation, Toledo, OH (US)

( * ) Notice: Subject to any disclaimer, the term of this patent is extended or adjusted under 35 U.S.C. 154(b) by 26 days.

(21) Appl. No.: 10/762,362

(22) Filed: Jan. 23, 2004

(51) Int. Cl.
*H02P 9/10* (2006.01)
*H02P 9/14* (2006.01)
*H02P 6/00* (2006.01)
*H02K 21/00* (2006.01)
*H02K 23/00* (2006.01)

(52) U.S. Cl. .................. 322/59; 318/254; 318/701
(58) Field of Classification Search ............ 318/254, 318/701; 322/90, 19, 20, 59
See application file for complete search history.

(56) References Cited

U.S. PATENT DOCUMENTS

| 5,594,322 | A | 1/1997 | Rozman et al. ............... 322/10 |
|---|---|---|---|
| 5,841,262 | A * | 11/1998 | Tang ............................ 318/701 |
| 5,936,386 | A * | 8/1999 | Heglund ........................ 322/94 |
| 6,011,377 | A | 1/2000 | Heglund et al. ............. 318/701 |
| 6,014,003 | A | 1/2000 | French ........................ 318/701 |
| 6,051,942 | A | 4/2000 | French ........................ 318/254 |
| 6,177,734 | B1 | 1/2001 | Masberg et al. .............. 290/31 |
| 6,365,983 | B1 | 4/2002 | Masberg et al. .......... 290/40 C |
| 6,396,237 | B1 * | 5/2002 | Mayes .......................... 318/701 |
| 6,593,720 | B1 * | 7/2003 | Omekanda ................... 318/701 |
| 2002/0185989 | A1 * | 12/2002 | Rahman et al. ............. 318/701 |
| 2003/0011347 | A1 * | 1/2003 | Kaplan et al. ................ 322/24 |
| 2003/0020436 | A1 * | 1/2003 | Coles et al. ................... 322/44 |
| 2004/0108826 | A1 * | 6/2004 | Green ......................... 318/254 |
| 2004/0245948 | A1 * | 12/2004 | Sakai et al. ................. 318/254 |

* cited by examiner

*Primary Examiner*—Julio Gonzalez
(74) *Attorney, Agent, or Firm*—Berenato, White & Stavish (57) ABSTRACT

The method is directed to controlling a switched reluctance generator operating in a high speed single pulse mode. The turn-off angle is selected according to an analytic fit optimal efficiency curve and the turn-on angle is used as the variable parameter to control power output of the switched reluctance generator. The method results in identifying the most efficient excitation angles and characterizes them for easy implementation under closed loop control. The switched reluctance generator operates under conditions of optimum efficiency under all circumstances.

9 Claims, 12 Drawing Sheets

CLOSED LOOP CONTROL OF EXCITATION PARAMETERS FOR HIGH SPEED SWITCHED-RELUCTANCE GENERATORS

FIELD OF THE INVENTION

The present invention is directed to a method of controlling the excitation parameters for a switched-reluctance generator (SRG) where the SRG system operates at sufficiently high speed that it operates in the single pulse mode.

BACKGROUND OF THE INVENTION

The use of SRGs is becoming more widespread with the availability of high-speed sensing and control systems for controlling their operation in varying operating conditions. These uses include aerospace power systems, i.e., driven by a turbine at very high sustained speeds, wind turbines, i.e., where blade geometry in conjunction with wind speed maintain predictable high torque and low speed inputs, and in hybrid drive automotive systems, where the switched reluctance machine (SRM) operates as both a motor or generator as necessary.

The control of an SRM is based on three variables. The reference current I, the turn-on angle $\theta_{on}$ and the turn-off angle $\theta_{off}$. The SRM produces torque, i.e., a reaction to spinning the rotor with respect to the stator, either positively (for motor function) or negatively (for generator function) depending on what the controller requires of the SRM. As a motor, the SRM control is relatively uncomplicated. A current is made available, and a turn-on angle is selected depending on a desired torque characteristic of the motor, that is, how much twist is required from the SRM at that moment. The turn-off angle is determined by choosing an angular duration of a torque pulse, i.e., the conduction angle (the angular difference between the turn-on and turn-off angles). Essentially, the operator chooses how much and how long a "pull" is placed on each rotor element as it approaches and passes each stator element.

Operating the SRM in a net "negative" torque mode as a generator is rather more complicated. The same parameters of control are available. That is, the turn-on and turn-off angles, but in this instance the current is usually a target inasmuch as it is being supplied to an electrical load as a result of electrical generation demand in the system. Hence, to have straight forward control of the SRM as a generator it is useful to apply a known input torque at a known rate so that depending on the output current and power desired, the turn-on and turn-off angles and resultant conduction angle can be chosen and the current and power demands reliably achieved.

However, in the application where an SRM is driven in an automotive IC engine setting, it is almost never the case that a known input torque and rate are supplied. Instead these inputs are transient as an IC engine transitions from idle to acceleration to constant speed to regenerative braking effect back to wide open throttle, etc., in the ordinary course of use. In such a circumstance where the rate and amount of input torque can vary widely, the combination of turn-on and turn-off angles that produce a specified output current from the SRM operating as an SRG are essentially endless. As such, control of an SRG in such operating conditions is quite difficult.

In addition, when the SRM is operated as a motor, it is the turn-on angle only that determines peak phase current. When the SRM is operated as a generator, both turn-on angle and turn-off angle influence the peak phase current. There are multiple combinations of turn-on and turn-off angles that are able to produce the same amount of average torque. This raises the issue of how to best select the turn-on and turn-off angle in order to achieve the required torque subject to some other control objective, such as maximizing efficiency.

Further, in selecting an SRM for automotive applications efficiency is paramount. The desire is to provide the necessary motive power, i.e., as a starter for the IC engine, while not adding extra weight to be carried by the vehicle in question and, at the same time, providing sufficient generating capacity for the electric power demands existing in the system. The ratio of mechanical input versus electrical output should be optimized for efficient operation.

SUMMARY OF THE INVENTION

According to the present invention method, turn-on and turn-off angles are the two parameters used to control the electric power generation of the SRG. The invention method results in a control system that automatically maintains the most efficient excitation angles in producing the required amount of electric power. The inventive method is focused on finding the most efficient excitation angles and characterizing them for implementation under closed loop control.

Switched-reluctance generator efficiency is characterized in terms of operating speed, power production and excitation angles. The most efficient turn-off angles are a function of power level and speed, hence, they can be represented through a curve fitting function. Once a power requirement P* and input speed $\omega$ are known, a turn-off angle can be determined according to this function. Once the turn-off angle is known, the turn-on angle can be found using an algorithm. The turn-on angles are the output of the closed loop power control algorithm. By choosing the most efficient turn-off angle at the outset, we can say that the turn-on angle which provides the required power level for that operating condition is the most efficient one. The inventive technique provides easy implementation of the control system by virtue of being closed loop. The excitation angles are easily optimized by determining the efficiency-optimal excitation parameters at only four operating points. The new control technique provides an efficient SRG controller that is easy to implement.

The present invention is directed to reliably and easily controlling an SRM operating as an SRG in high speed single pulse mode. The turn-on and turn-off angles are chosen according to an easily implementable closed loop control algorithm that automatically maintains the most efficient selection of angles to produce the required amount of electrical power. The turn-off angle is chosen according to an analytic fit curve fit according to an optimum efficiency criteria. The turn-on angle is then used as the variable parameter to control power output of the SRG.

DETAILED DESCRIPTION

Through modeling of an SRG using both simulation and experimentation, it can be determined that the optimal-efficiency turn-off angles for a given SRG can be characterized as a function of power and speed level. Within the closed-loop power controller according to the present invention, the optimal-efficiency turn-off angle is firstly determined from an analytic curve fit. The turn-on angle is then used as the degree of freedom necessary to regulate the power produced by the SRG. Given that the turn-off angle is initially selected for being associated with optimal-efficiency at each speed and power point, overall operation of the SRG is achieved at optimal-efficiency.

Figure 10:
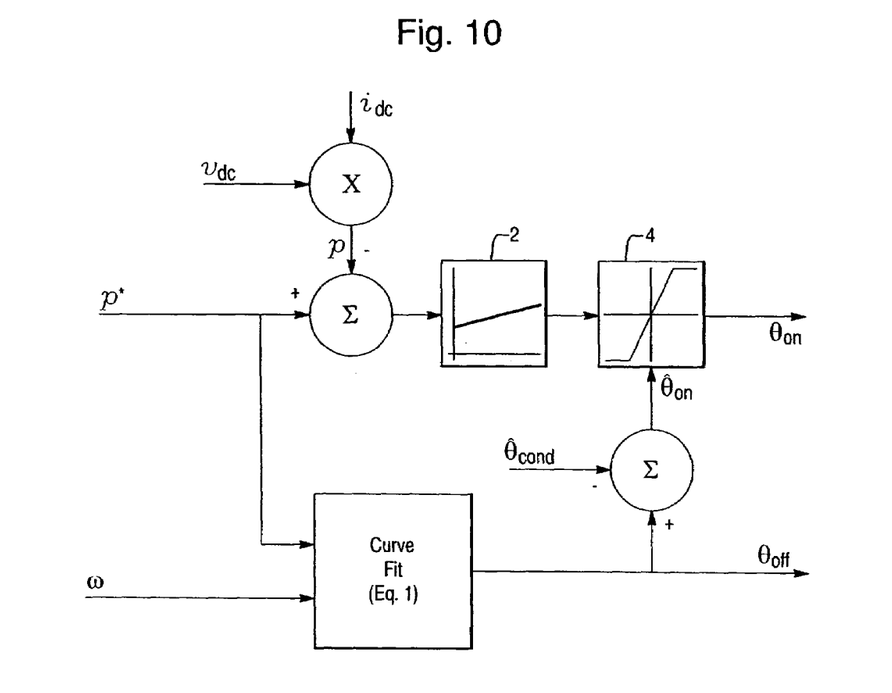
FIG. 10 shows the algorithm used to automatically adjust the excitation angles.

In the following description, the SRG, inverter and control system is modeled in Simulink in the first example to demonstrate the operation of the system when implemented within a voltage regulation system, i.e., an automotive IC engine driven environment. In the second example, the control technique is then applied to an actual experimental SRG system. Experimental operation documents that the technique provides for efficient operation of the SRG system through tuning the controller at only four operating points. The method does not need machine modeling or extensive simulations. The algorithm relies on experimental characterization at only four operating points, representing all combinations of low speed, high speed, low power and high power. Because these operating points can be characterized experimentally, it is not necessary to characterize them analytically. The algorithm is easy to implement and does not need look up tables for excitation parameters. Implementation of the method and included algorithm, shown in FIG. 10, is demonstrated in simulation and experiment for a four phase SRG when implemented as part of a voltage regulation system on a 1.8 kW SRG drive.

The Method and Algorithm

Figure 1:
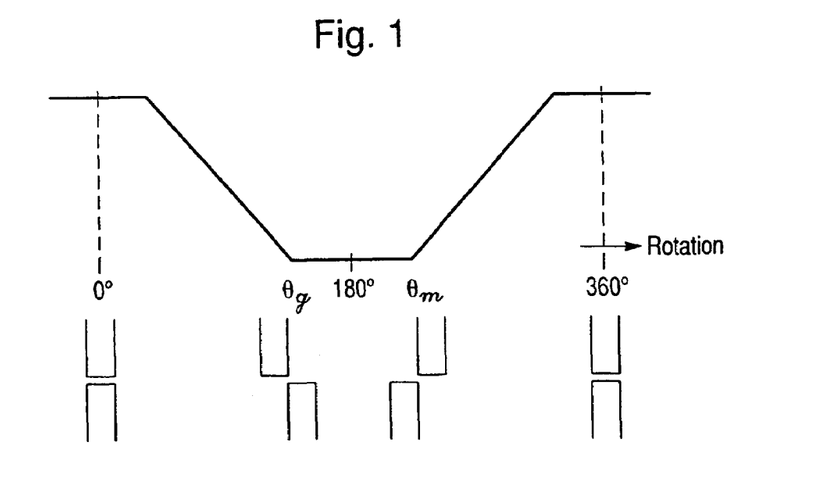
FIG. 1 shows a linear inductance profile of the SRM as a rotor element aligns with, passes away from, and then approaches again from the opposite side, a stator element.

The objectives of the algorithm are best explained through consideration of the linear inductance profile for the SRM shown in FIG. 1. The minimum inductance region is defined by the angular interval over which the rotor poles do not overlap the stator poles. The maximum inductance region is defined by the angular interval over which there is complete overlap between the stator and rotor poles. The regions of increasing and decreasing inductance correspond to varying overlap between the stator and rotor poles.

For operation of the SRM as a motor, phase current must be present in the phase winding as the inductance is increasing in the direction of rotation. For operation of the SRM as a generator, phase current must be present in the phase winding as the inductance is decreasing in the direction of rotation. The polarity of current is immaterial, so we assume that the phase current is always positive.

Figure 2:
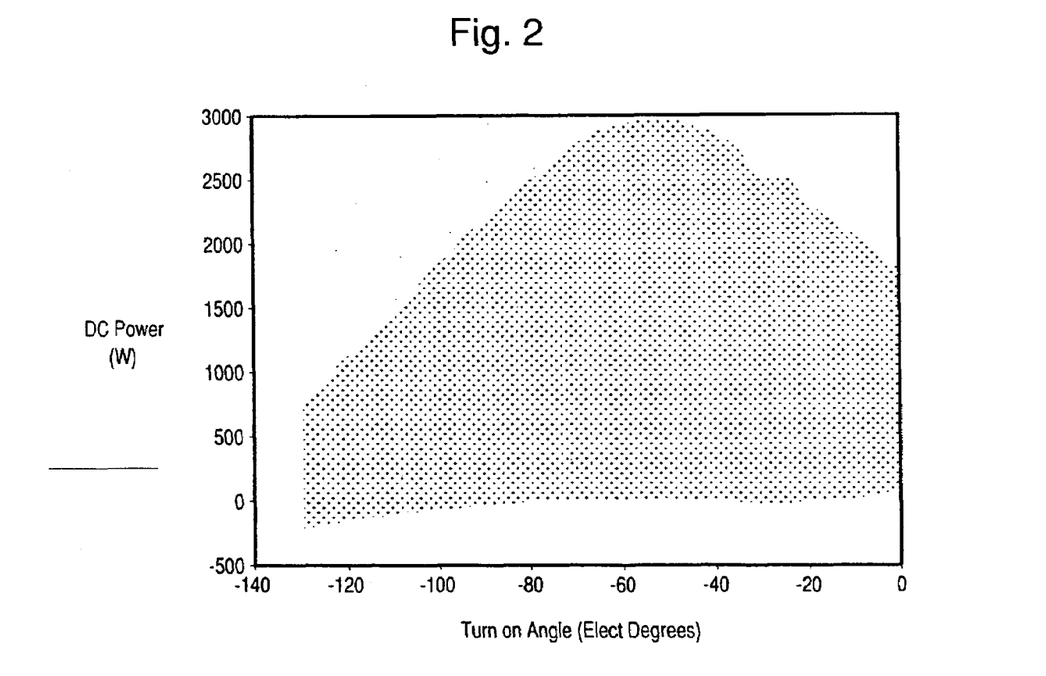
FIG. 2 shows dc power generation versus turn-on angle at 3000 rpm for all possible combinations of excitation angles.
Figure 3:
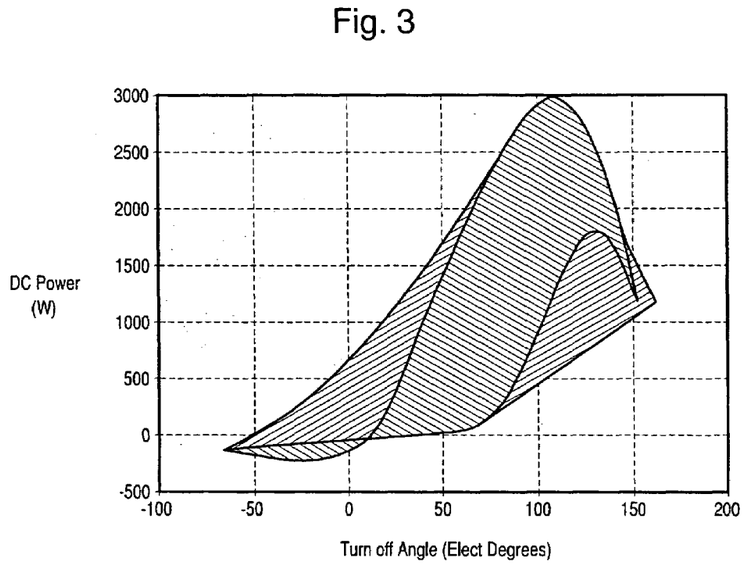
FIG. 3 shows dc power generation versus turn-off angle at 3000 rpm for all possible combinations of excitation angles.
Figure 4:
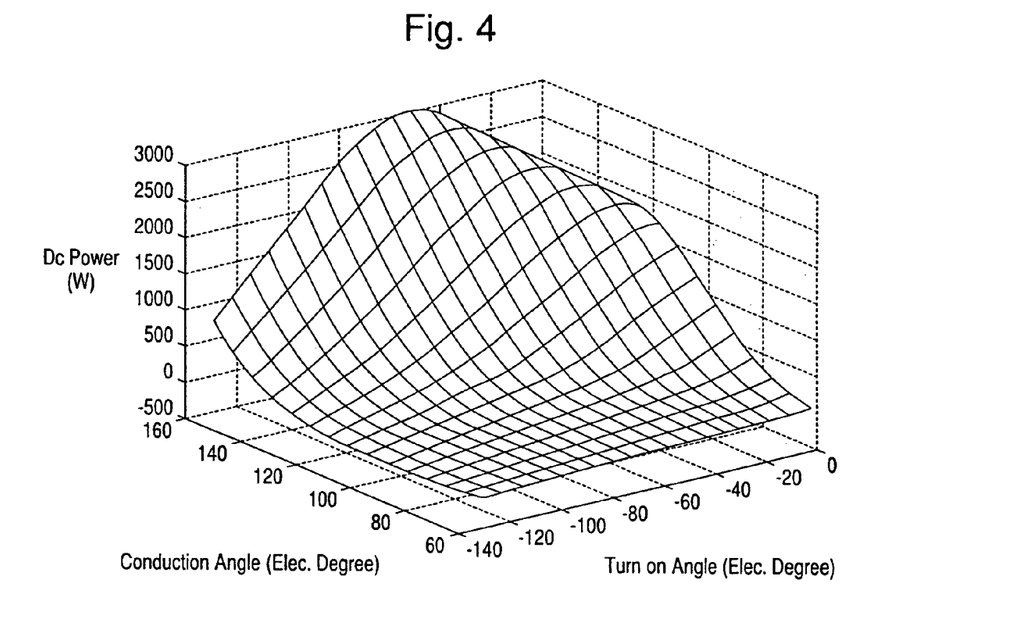
FIG. 4 shows optimal-efficiency dc power generation versus turn-on and conduction angles at 3000 rpm.
Figure 5:
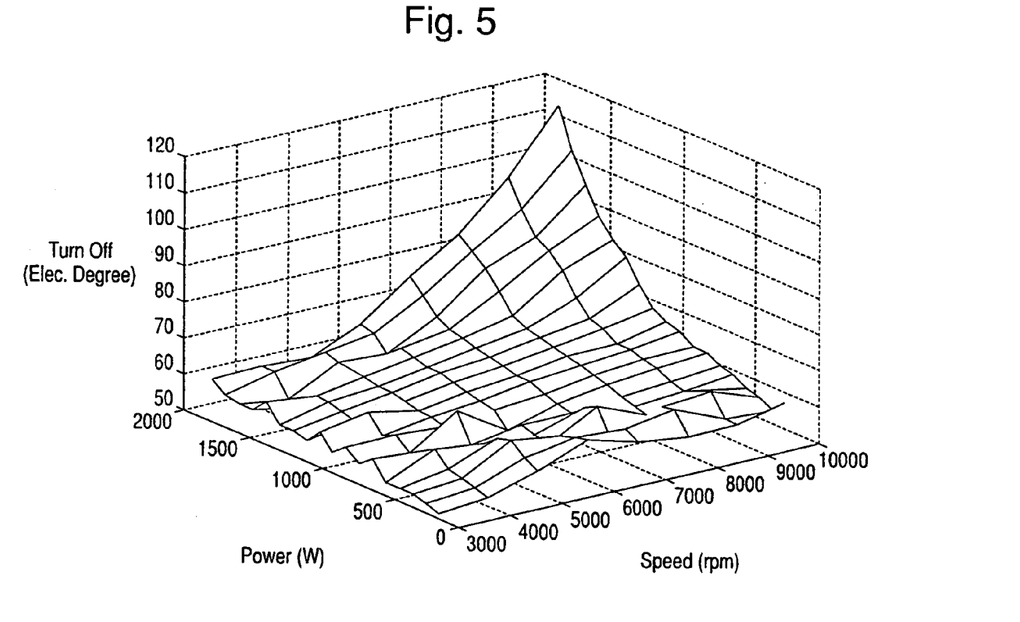
FIG. 5 shows optimal-efficiency turn-off angles as a function of speed and dc power.
Figure 6:
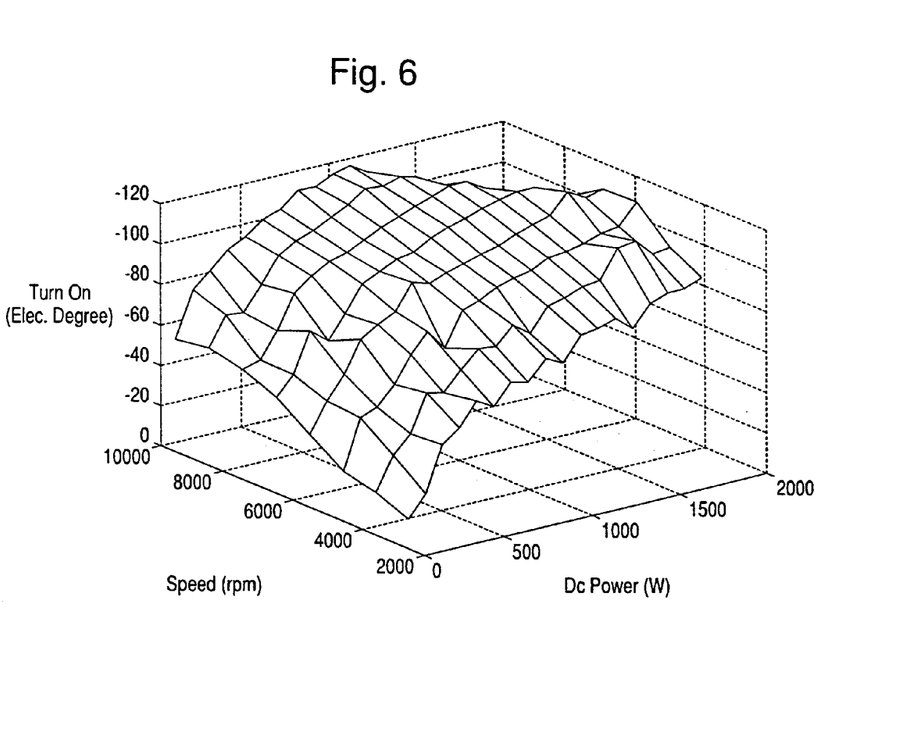
FIG. 6 shows optimal-efficiency turn-on angles as a function of speed and dc power.

As we operate the generator above base speed, i.e., 2000 rpm, the magnitude and shape of the phase current directly depends on the turn-on and turn-off angles. The amount of power generated is dictated by the phase current and its relative position with respect to inductance profile. In order to produce a map of power production for a given speed, turn-on and turn-off angles, the SRG is modelled using finite element magnetization data and the generator system is simulated for every 1000 rpm between 3000 rpm and 10,000 rpm with turn-on and turn-off angles taking on all combinations of turn-on angle and turn-off angle in increments of 2 electrical degrees. FIGS. 2, 3, and 4 show dc power generation versus excitation angles at 3000 rpm. Among all simulated data, the optimum turn-on and turn-off angles are selected for a given speed and power level. The criteria is to find the excitation angles that produce the required power at a given speed with minimum mechanical power for the specified SRG being simulated. FIGS. 5 and 6 show the optimal-efficiency excitation angles as a function of speed and power level.

It would require an extensive look up table to experimentally implement the optimum excitation angles, not to mention the time required to experimentally determine the optimum values of the turn-on and turn-off angles. Also due to the discrepancy between the actual system and the motor model and the constant changes in system parameters during the operation of the system, it is very difficult to achieve power control under open loop conditions prescribed by a look up table. Further, it will be appreciated by one skilled in the art that the use of a look up table creates issues associated with interpolation among discreet points within the table and the amount and speed of memory required in the controller to store the look up table.

Figure 7:
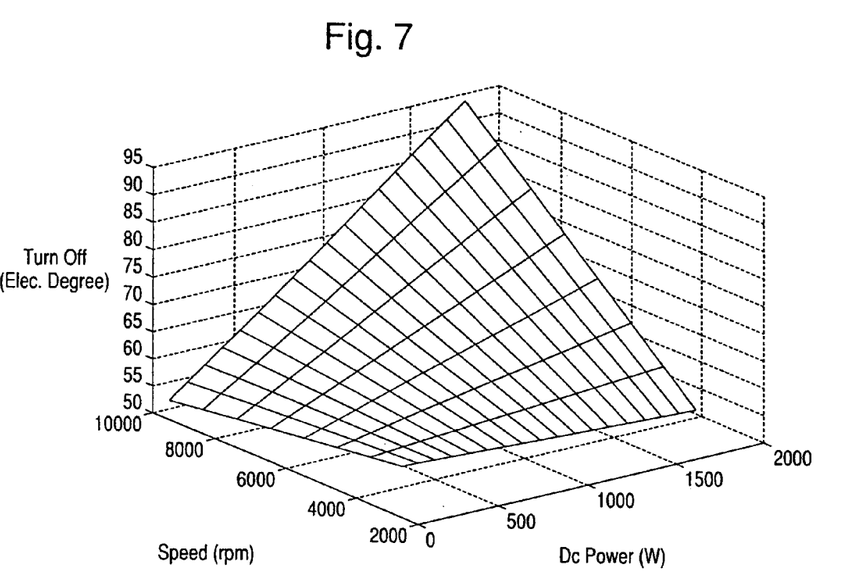
FIG. 7 shows optimal-efficiency turn-off angles as a function of speed and dc power with a curve fit to Eq. 1 using all optimized data.
Figure 8:
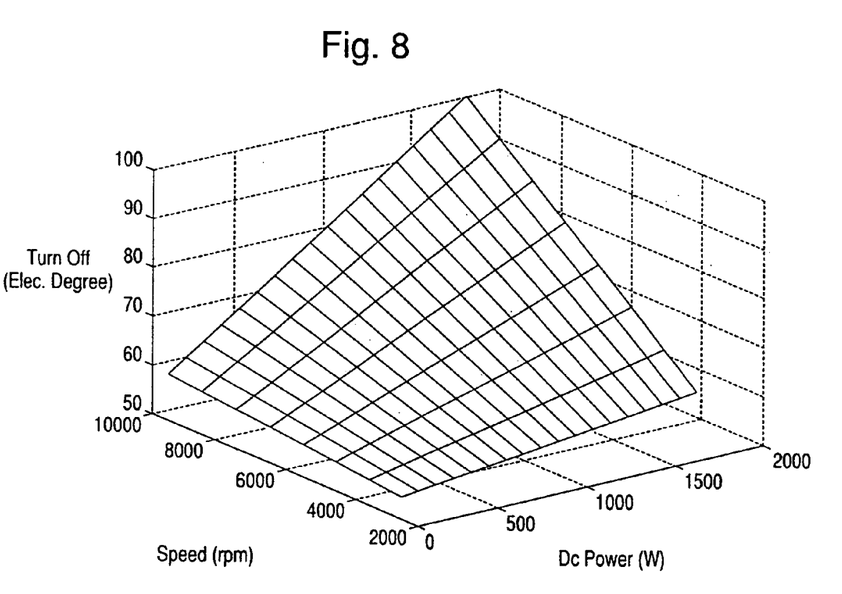
FIG. 8 shows optimal-efficiency turn-off angles as a function of speed and dc power with a fit to Eq. 1 using only four points from the optimized data.
Figure 9:
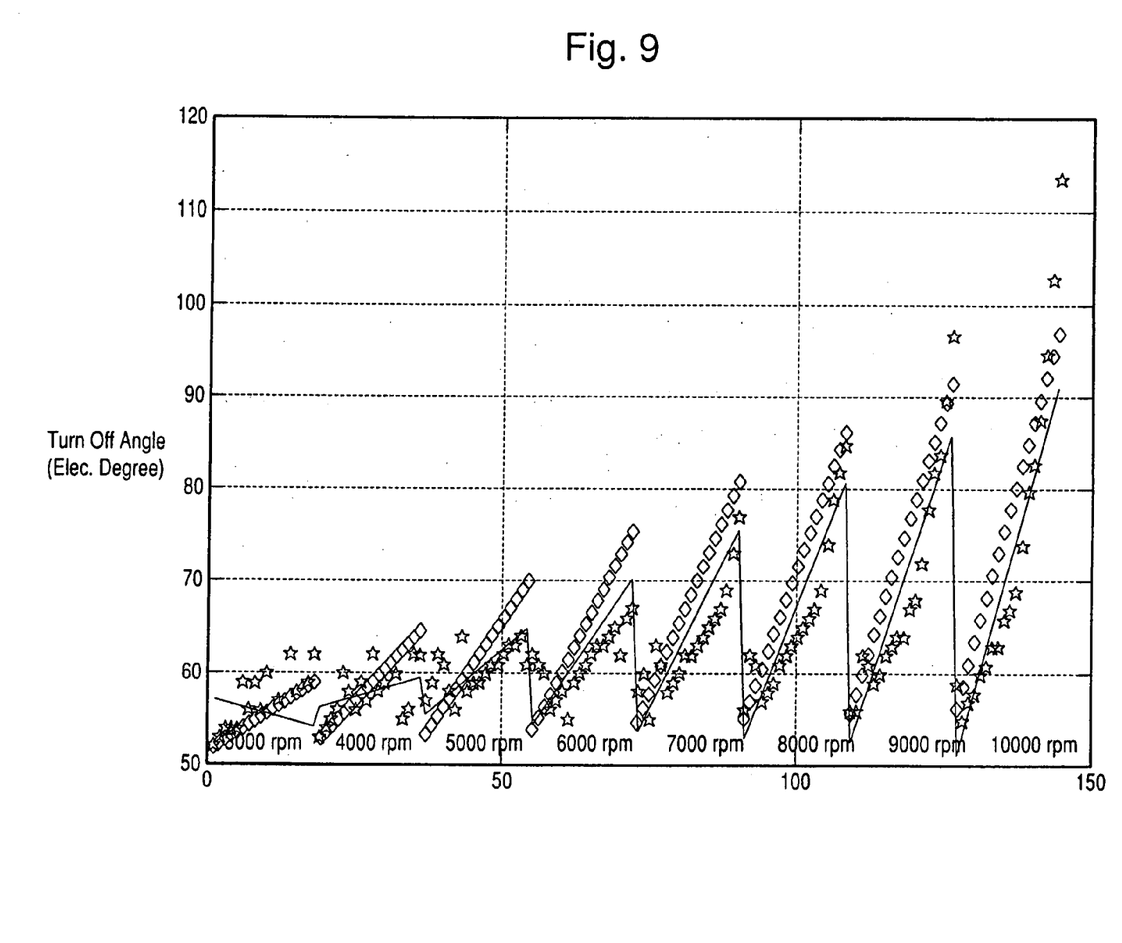
FIG. 9 shows a comparison of the curve fits for turn-off angles. Stars show all of the optimized turn-off angles. Solid lines show the turn-off angles with a curve fit to Eq. 1 using all of the turn-off angles. Diamonds show the curve fit using only four points from the optimized data.

As shown in the Figures, the optimum turn-off angles are a function of operating speed and average output power. The optimum turn-off angles can be represented as Eq. 1:

$$\theta_{off} = k_1 \omega p + k_2 \omega + k_3 p + k_4$$

where $\omega$ is rotor speed, "p" is the output power and $k_{1-4}$ are curve fit parameters. For our simulation work, the curve fit parameters are based on a least squares fit to the collection of optimal turn-off angles over all operating points above base speed. For our experimental work the curve fit parameters are based on the optimized data for four operating points representing all combinations of low speed, high speed, low power and high power. FIGS. 7, 8, and 9 show the curve fit of the turn-off angles using all data and data from only four operating points. As seen from these figures the curve fit using only four data gives results that are close to the actual optimized turn-off angles.

For lower speeds and power levels, there can be observed some deviation between the optimized turn-off angles and the angles predicted by the curve fit. This is a reflection of the inconsistency in the efficiency-optimal turn-off angles determined through simulation. However, due to the general nature of the SRM we know that small changes in excitation parameters will not cause a significant change in the achieved efficiency. Further, at lower speeds and power levels there are more combinations of excitation parameters that support a particular operating point. Finally, we satisfy ourselves that the trend in turn-off angle is consistent with Eq. 1 (above) even for a curve fit based on only four operating points, and that the curve fit improves as speed and power levels increase.

As explained earlier, only the turn-on and turn-off angles have control over power generation for operation above base speed. From the above studies the efficiency-optimal turn-off angles for a given specified SRG are easily determined through simulation. Once the turn-off angle is selected, the closed loop power control can then provide the turn-on angle. Since the turn-off angle is optimum for a given speed and power, the turn-on angle being output by the power controller is then guaranteed to be efficiency-optimal as well. Approached in this manner, closed-loop control of output power is maintained while enforcing optimal efficiency. This is based on the premise that while there are multiple turn-on and turn-off angle combinations that will provide the same output power at a particular operating speed, only one pair will yield the highest efficiency. FIG. 10 shows the closed loop power control algorithm. Adjustment of the turn-on angle is constrained (as shown as $\theta_{cond}$) to prevent continuous conduction of the phase currents.

In the FIG. 10 algorithm, the power requirement P* is summed, through the Σ function, with the available power P and passed through a proportional integral controller 2 to assess the trend of successive power requirements and adjust the turn-on angle accordingly. Where there is a power surplus, the turn-on angle is increased proportionally, where there is a power deficit the turn-on angle is decreased proportionally. This power requirement is then used, in conjunction with the $\theta_{on}$ result set in accord with $\theta_{cond}$, to select the optimum turn-on angle subject to a limiter function 4. The limiter is used to prevent destructive changes in the operation of the switched reluctance generator.

Simulation Example

The algorithm previously described was implemented in simulation to confirm proper operation before an actual prototype was constructed. The specified SRG to which the simulation is applied is a 16/12 four-phase SRM designed for a 1.8 kW 12 V automotive application; Table 1 gives the parameters of the SRG used in this simulation work.

TABLE 1

| Quantity | Value | Units |
| --- | --- | --- |
| Rated Power | 1800 | W |
| Base Speed | 2000 | rpm |
| Maximum Speed | 10,000 | Rpm |
| Dc Voltage | 14.8 | V |
| # of Rotor Poles | 12 | |
| # of Stator Poles | 16 | |
| # of phases | 4 | |

TABLE 1-continued

| Quantity | Value | Units |
| --- | --- | --- |
| Aligned Phase Ind. | 0.2290 | mH |
| Unaligned Phase Ind. | 0.0175 | mH |
| $\theta_g$ | 132 | Degrees (elect.) |
| $\theta_m$ | 228 | Degrees (elect.) |

Figure 11:
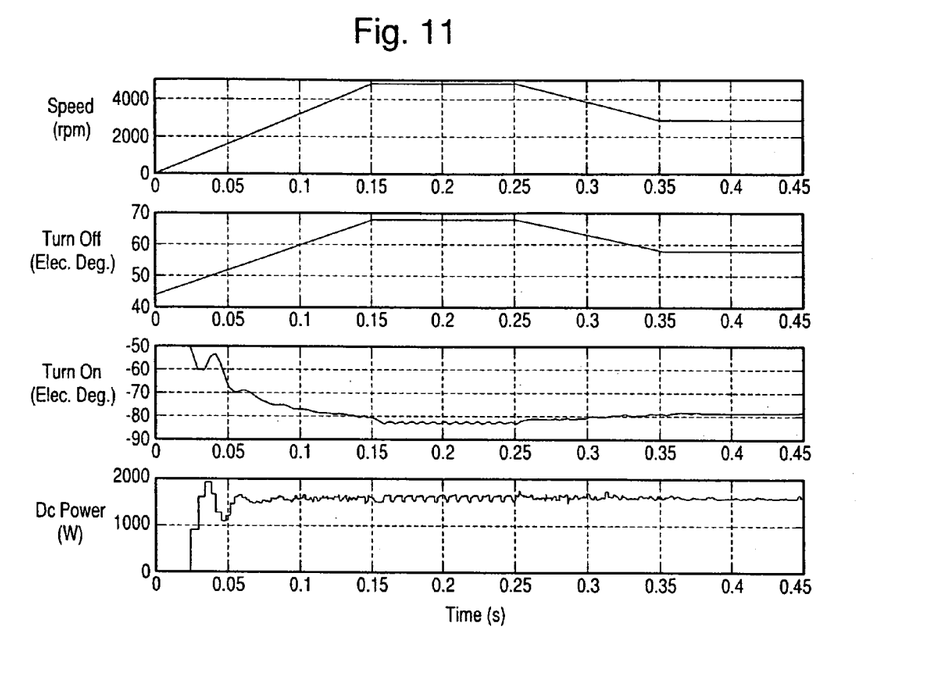
FIG. 11 shows simulation results of the implemented control technique with 1600 W reference power with a varying speed profile.
Figure 12:
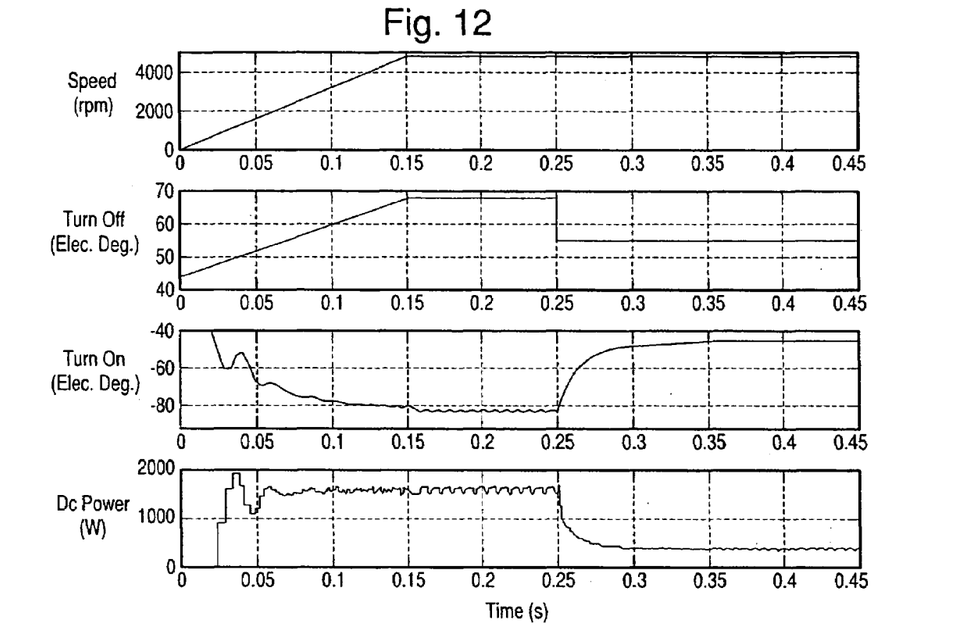
FIG. 12 shows the simulation results of the implemented control technique where speed is ramped to 5000 rpm in 0.15 s and kept constant and the power is changed from 1600 W to 300 W at 0.25 s.

The SRG magnetics are modeled analytically based on data collected through finite element analysis. FIG. 11 shows the result of the proposed power control technique for 1600 W reference power and varying speed profile. FIG. 12 shows the simulation results of the implemented control technique where speed is ramped to 5000 rpm in 0.15 s and kept constant. The power reference is changed from 1600 W to 300 W at 0.25 s. These figures show the control technique provides the commanded (demanded) power by adjusting the excitation angles. To the extent that the turn-off angle corresponds to that required for peak efficiency based on the control algorithm, the required power is produced with the highest efficiency possible.

Experimental Examples

Figure 13:
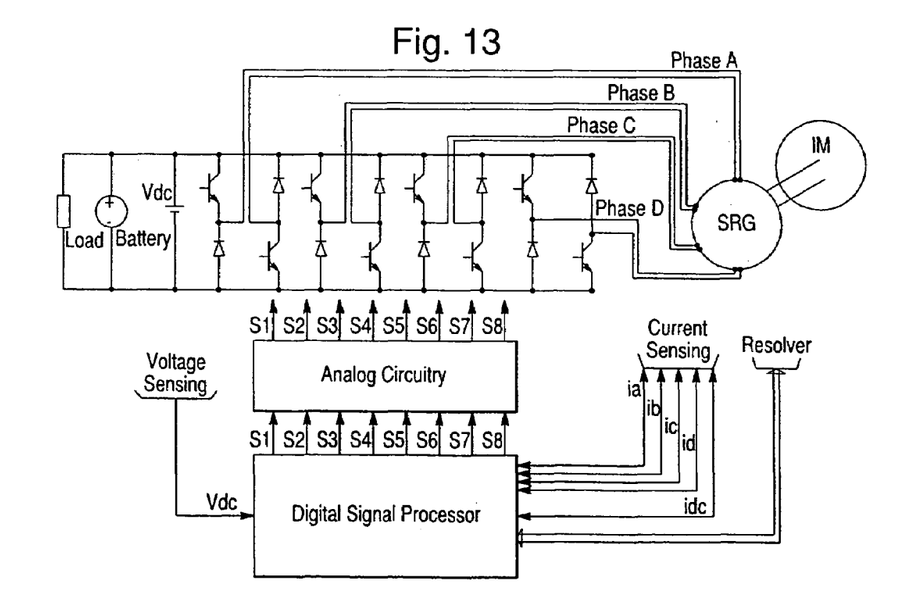
FIG. 13 shows the block diagram of the experimental setup.

The performance of the controller is experimentally verified through a 16/12 four-phase SRG designed for a 1.8 kW 12 V automotive application. The control algorithm according to the present invention is implemented using an Analog Devices ADMC401 digital signal processor. The SRG is coupled to an induction motor, which acts as constant speed mechanical power source using an adjustable speed drive. A resolver with resolver to digital converter circuitry provides 12 bit position information to the DSP. The 12 V battery and load resistors are connected in parallel to the inverter. FIG. 13 shows the block diagram of the experimental setup for the tests.

We experimentally determined the optimum turn-off angles for four operating points representing all combinations of low and high speed with low and high power.

Figure 14:
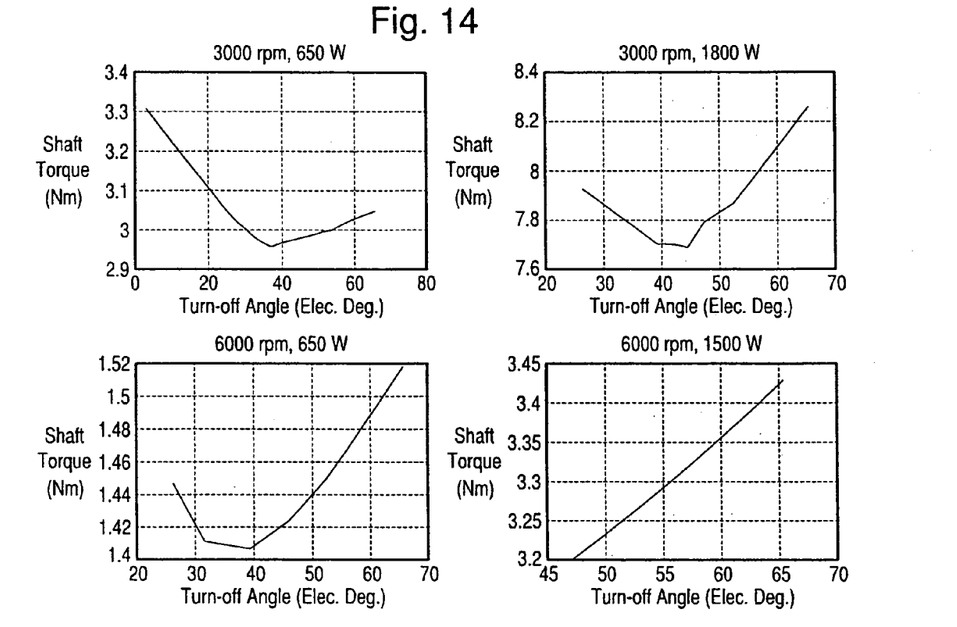
FIG. 14 shows the variation in shaft torque with turn-off angle determined experimentally.

FIG. 14 shows the input shaft torque versus turn-off angles at 3000 and 6000 rpm with low and high power levels. The turn-off angle providing the desired power with the minimum torque is the most efficient one. The turn-off angles of interest are those that minimize shaft torque while supporting the required output power at speed.

Figure 15:
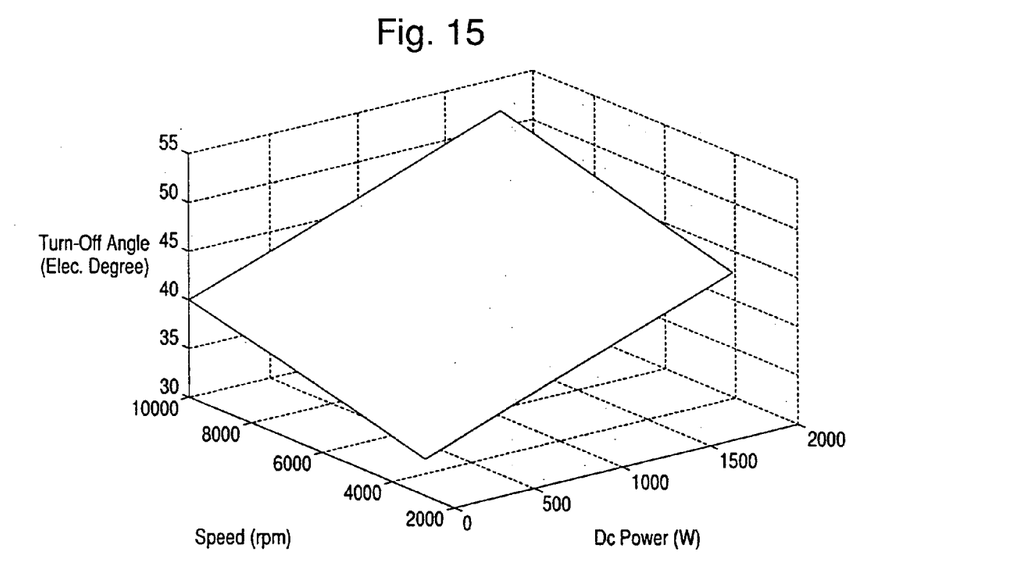
FIG. 15 shows the experimentally determined optimal-efficiency turn-off angle as a function of speed and power.

Having the most efficient excitation angles for four operating points we determine the turn-off angles for any given point using Eq. 1. FIG. 15 shows the dependence of turn-off angle on speed and power using experimental data from the four operating points.

In an automotive application, the power produced by the SRG is used to regulate the voltage of the electrical system. Accordingly, voltage control is implemented as an outer control loop that is responsible for establishing the setpoint for the power controller. The voltage controller commands the reference power necessary to drive the output voltage to the required level. In order not to harm mechanical components, i.e, overwhelming the supplied torque and stalling the IC engine, and to control the charging rate of the battery, a rate limiter is implemented. The rate limiter interacts with the PI controller to keep the integrator out of saturation. Table 2 provides the parameters used in the voltage and power controllers.

TABLE 2

| Quantity | Value | Units |
|---|---|---|
| $K_p$(Power) | 0.033 | Degrees/W (electrical) |
| $K_i$(Power) | 1.899 | Degrees/J (electrical) |
| $\theta_{cond}$ | 178 | Degrees (electrical) |
| $k_1$ | 7.41e−7 | Degrees/W (electrical) |
| $k_2$ | 5.55e−4 | Degrees (electrical) |
| $k_3$ | 4.44e−3 | Degrees/W (electrical) |
| $k_4$ | 31.33 | Degrees (electrical) |
| $K_p$(Voltage) | 140.65 | W/V |
| $K_i$(Voltage) | 1620.80 | W/Vs |

Figure 16:
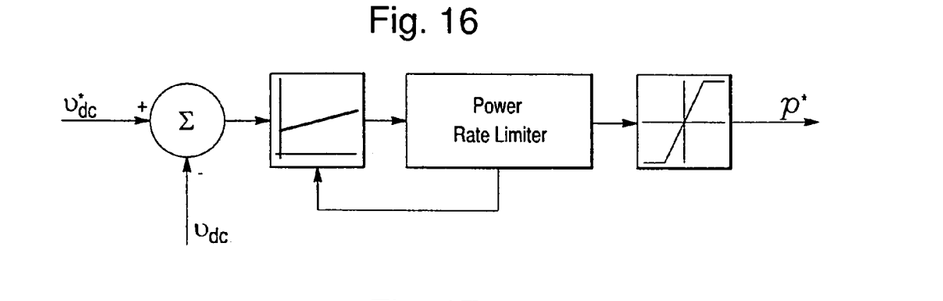
FIG. 16 shows the algorithm used to control the dc bus voltage.
Figure 17:
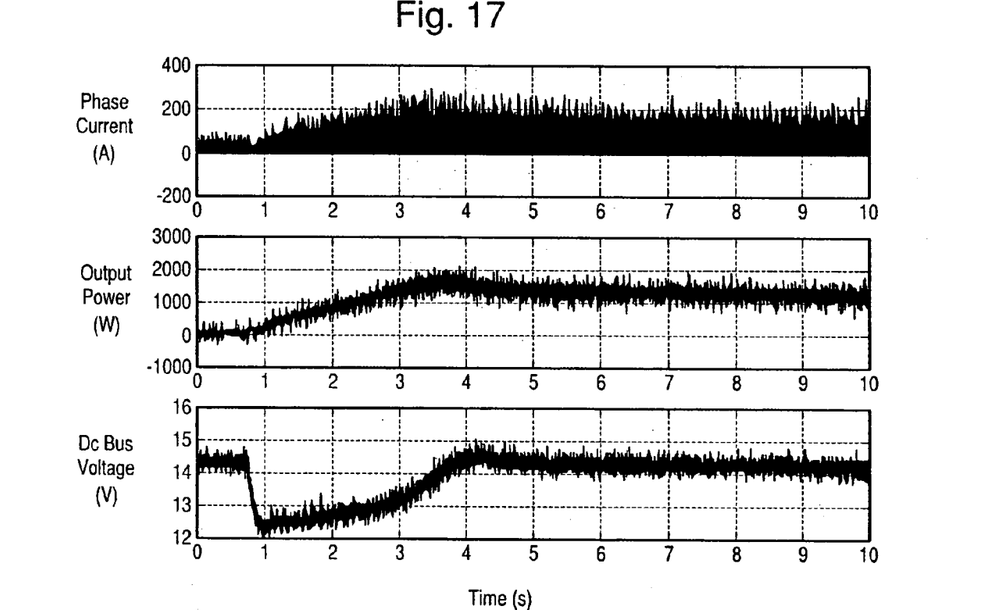
FIG. 17 shows the response from the experimental system where the load is changed from 300 W to 1600 W.
Figure 18:
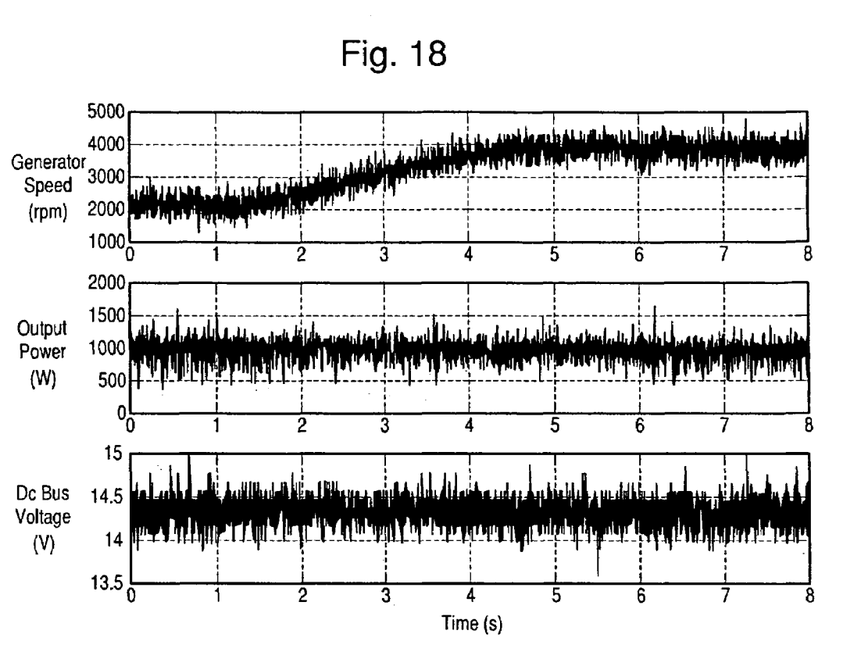
FIG. 18 shows the response of the experimental system where the speed is changed from 2000 rpm to 4000 rpm.

FIG. 16 shows the block diagram of the voltage controller applied experimentally. FIG. 17 shows the response of the experimental system where the load is changed from 300 W to 1600 W. The rate of change of power is limited to 600 W/s. FIG. 18 shows the response of the system where the speed is changed from 2000 rpm to 6000 rpm.

We claim:

1. A closed loop method of controlling the power output of a specified switched reluctance generator operating as a part of an electrical power system, where said generator is operating in single pulse mode, by controlling the excitation parameters of turn-on and turn-off angle taking into account the input speed to the generator and the power requirement from the electrical power system, comprising the steps of:
   supplying mechanical input to said specified switched reluctance generator;
   receiving a power requirement indication from said electrical power system;
   calculating an optimal efficiency turn-off angle for said switched reluctance generator according to the optimum efficiency of power production for said specified switched reluctance generator as a result of an analytical curve fit function taking into account said power requirement and mechanical input speed and performance parameters of said specified switched reluctance generator, and;
   thereafter, determining an optimal efficiency turn-on angle for said switched reluctance generator based on supplying electrical power to meet a power requirement of said power system in accord with said power requirement indication and said previously calculated optimal turn-off angle.

2. A method as in claim 1, wherein:
   said mechanical input is provided by an internal combustion engine.

3. A method as in claim 1, wherein:
   said function for determining said specified switched reluctance generator turn-off angle $\theta_{off}$ comprises:

$$\theta_{off} = k_1 \omega p + k_2 \omega + k_3 p + k_4$$

where $\omega$ is rotor speed reflecting mechanical input power, "p" is the output power reflecting said power requirement indication, and $k_{1-4}$ are curve fit parameters based on a least squares fit to data representing the collection of optimal turn-off angles for said specified switched reluctance generator.

4. A method according to claim 3, wherein:
   said curve fit parameters are based on the optimized data of four operating points representing all combinations of low speed, high speed, low power, and high power for said specified switched reluctance generator.

5. A method as in claim 4, wherein:
   said mechanical input is provided by an internal combustion engine.

6. A closed loop method of controlling the voltage output at a relatively constant level of a specified switched reluctance generator operating as a part of an electrical power system, where said generator is operating in single pulse mode, by controlling the excitation parameters of turn-on and turn-off angle, comprising the steps of:
   supplying mechanical input to said switched reluctance generator, receiving a voltage requirement indication from said electrical power system, determining a turn-off angle for said switched reluctance generator according to the optimum efficiency of power production for said specified switched reluctance generator as a result of an analytical curve fit function taking into account said voltage requirement and mechanical input speed and optimal efficiency operating parameters of said specified switched reluctance generator, and, thereafter;
   determining a turn-on angle for said switched reluctance generator based on supplying electrical power to meet a voltage requirement of said power system in accord with said voltage requirement indication and said previously determined optimal efficiency turn-off angle.

7. A method as in claim 6, wherein:
   said mechanical input is provided by an internal combustion engine.

8. A closed loop method of controlling the rate of change of the power output setpoint of a specified switched reluctance generator operating as a part of an electrical power system, where said generator is operating in single pulse mode, by controlling the excitation parameters of turn-on and turn-off angle, comprising the steps of:
   supplying mechanical input to said switched reluctance generator, receiving a power requirement indication from said electrical power system, determining a turn-off angle for said switched reluctance generator according to the optimum efficiency of power production for said specified switched reluctance generator as a function of said power requirement and mechanical input speed, and, thereafter,
   determining a turn-on angle for said switched reluctance generator based on supplying electrical power to meet a power requirement of said power system in accord with said power requirement indication, and
   controlling the rate at which said power system responds to meet said power requirement to preserve said mechanical input speed above a predetermined threshold speed.

9. A method as in claim 8, wherein:
   said mechanical input is provided by an internal combustion engine.

* * * * *